United States Patent
Celikyilmaz et al.

(10) Patent No.: US 10,812,618 B2
(45) Date of Patent: Oct. 20, 2020

(54) FLIGHT DELIVERY ARCHITECTURE

(71) Applicant: Microsoft Technology Licensing, LLC, Redmond, WA (US)

(72) Inventors: Ilker Celikyilmaz, Kirkland, WA (US); Shobana Krishnamoorthy, Redmond, WA (US); Min Shao, Bellevue, WA (US); Randy D. Thomson, Redmond, WA (US); Divyachapan S. Padur, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/389,077

(22) Filed: Dec. 22, 2016

(65) Prior Publication Data

US 2018/0062918 A1  Mar. 1, 2018

Related U.S. Application Data

(60) Provisional application No. 62/379,101, filed on Aug. 24, 2016.

(51) Int. Cl.
*G06F 15/177* (2006.01)
*H04L 29/08* (2006.01)
*H04L 12/24* (2006.01)

(52) U.S. Cl.
CPC .......... *H04L 67/32* (2013.01); *H04L 41/5054* (2013.01); *H04L 67/10* (2013.01); *H04L 67/34* (2013.01)

(58) Field of Classification Search
None
See application file for complete search history.

(56) References Cited

U.S. PATENT DOCUMENTS

| 7,089,259 | B1 * | 8/2006 | Kouznetsov | ........ H04L 63/0428 |
| 7,293,038 | B2 | 11/2007 | Blevins et al. | |
| 8,489,674 | B2 | 7/2013 | Srivastava et al. | |
| 2003/0018784 | A1 * | 1/2003 | Lette | ........ H04L 67/16 |
| | | | | 709/226 |

(Continued)

OTHER PUBLICATIONS

Kazemzadeh, et al., "Opportunistic Multipath Forwarding in Content-Based Publish/Subscribe Overlays", In Proceedings of 13th International Middleware Conference, Dec. 3, 2012, pp. 1-20.

(Continued)

*Primary Examiner* — Brian Whipple
*Assistant Examiner* — Gregory P Tolchinsky
(74) *Attorney, Agent, or Firm* — International IP Law Group, PLLC

(57) ABSTRACT

Various systems and methods for flight delivery are disclosed herein. In one example, a system includes a processor to process a flight configuration delivery service instruction to schedule the flight by sending the flight to a service bus based on an identification of a temperature of the farm. The system may also include the service bus to alert the farm of the flight for the farm to consume, wherein the service bus returns a notification to the flight configuration deliver service for a farm that does not consume the flight. In an example, a memory stores, based on instructions from the flight configuration delivery service, an identification of the farm that did not consume the flight in the memory.

21 Claims, 12 Drawing Sheets

(56) References Cited

U.S. PATENT DOCUMENTS

| | | | |
|---|---|---|---|
| 2005/0262205 A1 | 11/2005 | Nikolov et al. | |
| 2008/0235246 A1 | 9/2008 | Hampapur et al. | |
| 2008/0270411 A1* | 10/2008 | Sedukhin | H04L 67/16 |
| 2009/0144333 A1 | 6/2009 | Feng et al. | |
| 2010/0313203 A1* | 12/2010 | Dawson | G06F 1/3203 |
| | | | 718/102 |
| 2012/0226789 A1 | 9/2012 | Ganesan et al. | |
| 2013/0108263 A1* | 5/2013 | Srinivas | H04Q 3/0083 |
| | | | 398/45 |
| 2013/0268672 A1* | 10/2013 | Justafort | H04L 67/10 |
| | | | 709/226 |
| 2014/0282944 A1* | 9/2014 | Li | H04L 29/08153 |
| | | | 726/6 |
| 2015/0128293 A1* | 5/2015 | Hitomi | H04L 65/60 |
| | | | 726/29 |
| 2016/0337169 A1* | 11/2016 | Chhabra | H04L 41/0672 |
| 2017/0222910 A1* | 8/2017 | Cai | H04L 43/16 |
| 2017/0270148 A1* | 9/2017 | Jose | G06F 16/273 |
| 2017/0343368 A1* | 11/2017 | Rangan | G01C 21/3484 |
| 2018/0084081 A1* | 3/2018 | Kuchibhotla | H04L 41/0816 |

OTHER PUBLICATIONS

Wang, et al., "Subscription Partitioning and Routing in Content-based Publish/Subscribe Systems", In Proceedings of 6th International Symposium on Distributed Computing, Oct. 28, 2002, 8 pages.

"Publish/Subscribe", Published on: Jul. 7, 2010, 8 pages. Available at: https://msdn.microsoft.com/en-us/library/ff649664.aspx.

"Example of a single queue manager publish/subscribe configuration", Retrieved on: Aug. 19, 2016, 1 page. Available at: http://www.ibm.com/support/knowledgecenter/en/SSFKSJ_9.0.0/com.ibm.mq.pro.doc/q004900_.htm?view=embed.

Mantellini, Pablo, "Introducing Pub/Sub Pattern for Anypoint Templates", Published on: Jul. 7, 2015, 7 pages. Available at: http://blogs.mulesoft.com/cloud-integration-connectors/introducing-pubsub-pattern-for-anypoint-templates/.

"What is Google Cloud Pub/Sub?", Published on: Mar. 19, 2015, 6 pages. Available at: https://cloud.google.com/pubsub/overview.

Manheim, Seth, "How to use Service Bus topics and subscriptions", Published on: May 2, 2015, 16 pages. Available at: https://azure.microsoft.com/en-in/documentation/articles/service-bus-dotnet-how-to-use-topics-subscriptions/.

Hohpe, Gregor, "Google Cloud Pub/Sub", Published on: Apr. 8, 2015, 4 pages. Available at: http://www.enterpriseintegrationpatterns.com/ramblings/82_googlepubsub.html.

* cited by examiner

FLIGHT DELIVERY ARCHITECTURE

BACKGROUND

Servers and other resources can include configurations, software, features, and can be updated based on newer versioning in software or by user preference. Multiple resources can be pooled together and can be referred to collectively as a farm. A user can use a farm individually or groups of users can share use of a farm. A farm may be one of many farms in a data center, where there may be several data centers in a region. Each farm may deploy a single platform environment or multiple types of environments even within the same enterprise system. The features, software, configuration, and code executed in each farm can be deployed in the form of flights that may be communicated to the farms, where the flights can alter or replace the features, software, and code for execution within the farm.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary presents a few concepts of the claimed subject matter in a simplified form as a prelude to the more detailed description that is presented later.

An embodiment provides a system for flight delivery including a processor to process flight configuration delivery service instruction to schedule the flight by sending the flight to a service bus based on an identification of a temperature of the farm. The system may also include the service bus to alert the farm of the flight for the farm to consume, wherein the service bus returns a notification to the flight configuration deliver service for a farm that does not consume the flight. In an example, a memory stores, based on instructions from the flight configuration delivery service, an identification of the farm that did not consume the flight in the memory.

An embodiment provides a method including scheduling a flight to provide configuration information to a farm and identifying a temperature of the farm. The method can also include sending the flight to a service bus that alerts the farm of the flight for the farm to consume, wherein the service bus alerts the farm based on the temperature of the farm. The method may also modify a retry attempt timing for a retry flight to the farm in response to a notification that the flight is not consumed by the farm.

An embodiment provides a tangible, non-transitory, computer-readable medium including instructions that, when executed by a processor, direct the processor to deliver a communication. In an example, the instructions to direct the processor can schedule a flight to provide configuration information to a farm and identify a temperature of the farm. The instruction can also instruct the processor to send the flight to a service bus that alerts the farm of the flight for the farm to consume, wherein the service bus alerts the farm based on the temperature of the farm. The instruction can instruct the processor to modify a retry attempt timing for a retry flight to the farm in response to a notification that the flight is not consumed by the farm.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
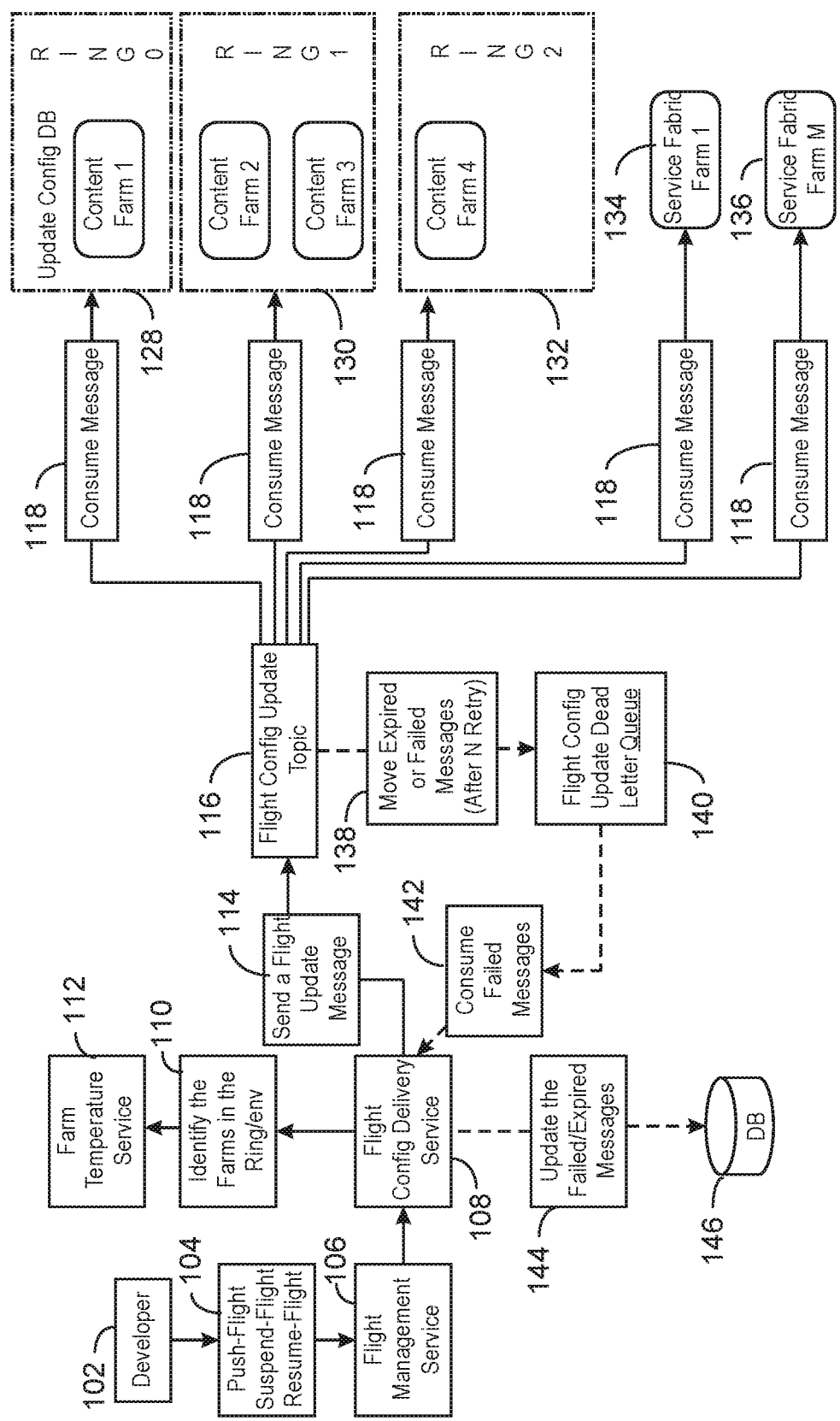
FIG. 1 shows a schematic diagram showing a publication-subscription model for flight delivery to farms between multiple rings.

As used herein, a farm refers to a collection of servers, processors, databases, and network devices. A farm may be one of many farms in a data center. As discussed above, enterprise systems that can be part of a farm can have a number of environments or zones. For example, environments can include EDog, O365, and other similar deployments which can contain many isolated dedicated customer environments. Each environment of a farm can be used to communicate with other systems and may in turn receive updates for the farm's environmental state and settings configurations. Currently, these feature deployments, updates, messages, and configurations for a farm can be referred to as flights. In an example, a flight could include a user interface revamp, such as the altering of a configuration and appearance of control buttons displayed in a user interface for a program hosted within the farm. Current flight delivery technology, such as a policy based flight management system like Flight on Rails, is designed to run in isolation in each environment, where each instance needs to be monitored and maintained. In production systems, especially those with large or a growing number of various environments, the maintenance cost of managing the flights and environments for these farms can increase.

Package flights may be used to distribute packages given to a limited test group. Package flights allow different packages to be provided to a designated set of testers without disrupting the experience of other customers. Packages may be differ between flights. Package flights may pass a certification process. If a package flight appears successful with the limited group, the package may become available to other users by categorizing the package as a non-flighted submission.

During setup of package flights, specific people may be chosen to receive a package through the addition of those people to a flight group. Packages may be limited to specific versions of an operating system or build of software on a device. Package flights avoid delivery to people who have not been added to an indicated flight group or is using a device that doesn't support package flights The presently disclosed technology can accommodate target specific environments or farms. The present disclosure may show a system that can delay delivery for specific farms that have been identified as delaying update, or frozen. A frozen farm can be by user request, where the user may wish to avoid changes in features for their farm, in some cases a farm may be frozen only for a predetermined period of time. The presently disclosed technology can also utilize an architecture involving an asynchronous service bus to better allow scaling without a similar increase in expense. In an example, the use of a service bus can use a guaranteed message delivery protocol that is not present in present flight techniques. Further, the presently disclosed technique can manage the state of a farm, or a number of farms through the Service Bus using the service bus's message persistence features.

The use of the service bus described herein can also be used to reduce communication between flight delivery technology and the farms. Through the use of an environment agnostic service bus the barriers between environments can be overcome. Using the presently disclosed technology, and through overcoming the barriers of environments, a system architecture can implement a ring concept as a logical topography that refers to collections of farms. These collections can be grouped by various features of the farms including size of deployment, frequency of use, environment of the farms, total time of operation of a farm, time of a farms subscription to a service bus, and other similar identifying characteristics. In an example, in a logical topography including the rings herein disclosed, the flight delivery technology can deploy the changes in waves across a series of logical rings. The wave of deployment can go from smaller rings as a test case to larger and larger rings as the flights effect on smaller rings of farms are measured and adjusted. In an example, the flight delivery can have a priority of delivery or can even cancel delivery based on how critical the delivery is or how inactive the farm.

Wave of deployment may refer to packages in a flight being made available in a gradual rollout. A gradual rollout may include a percentage of people in a flight group to get packages from a submission at a time. The percentage of people receiving the package may be monitored to assess an initial feedback from the smaller group before rolling out the package flight more broadly. A percentage of people receiving the flight may be increased, halted, or reduced at a user indicated time without creating a new flight submission.

In an example, the presently disclosed flight delivery technology is designed to deliver flights to farms without the need of each farm being available at the time of flight information sent. As farms may be offline when a flight is deployed, the flight deployment may be asynchronous updating across farms. The asynchronous feature may be one aspect of using a service bus as an intermediary to deliver the flight information to each farm.

In a system with a large number of farms, and farms that may be offline temporarily, not every farm may be accessible during flight time due to use, power outage, and connectivity issues. Accordingly, rather than provide a communication and update service that cannot finish an update until every farm is online, the presently disclosed flights use a service bus with a guarantee of delivery through a notification system. This notification system can activate after a flight has attempted to deliver a message to a farm, and if the flight to a farm is unsuccessful, the notification system of the service bus may notify a flight delivery system that a message or flight has not delivered after certain period. The notification system may schedule a later attempt. This notification system and service bus functionality may reduce the need for the flight delivery system to confirm acknowledgement of receipt. Instead a flight delivery system rely on the service bus to provide warnings if a message was not received in a certain period of time or after a certain number of attempts. This reduction of confirmation messages can reduce an amount of communication slowing flight delivery.

In a previous system exclusively using direct communication rather than a flight delivery system that uses a service bus, both the farm and the flight delivery system would have to be online for a flight to be successfully conveyed. Using a service bus rather than directly managing flights allows for the flight delivery system, or alternatively a farm, to turn off without concern that a message gets delivered.

A flight can include a flight configuration for a farm, where the message body of the flight has a flight configuration and where metadata of the flight can be sent as message properties of the flight. Sending the message and the metadata of the flight can reduce the possibility for updating a message process while leaving behind information on a message format to read the message.

Further, during difficulty delivering a message, the present technique may avoid implementing auto-recovery actions managed by a central hub or the flight delivery system. Centrally managing the auto-recovery or retry attempts from a flight delivery system can involve more levels of communication than necessary. These unnecessary levels in auto-recovery may include the flight delivery system, the service bus, the farm, and consumer job at a farm. In the presently disclosed technique, retry and recovery attempts of the present flight delivery system handle these issues on a farm by farm basis through the service bus management of inactive or frozen farms. If a communication issue persists, then a farm may send a flight summary to the presently disclosed flight delivery technology where these problem cases can be addressed. This capability can reduce an on-call engineer's (OCE) effort and ensure consistency of the state of each farm. In the present disclosure, expired or failed messages from a dead letter queue can redeliver or generate an alert to the OCE. As used herein, dead letter queue may refer to queued communication that involves a threshold amount of dormancy. The queues may be associated with a time-to-live value on the message to ensure that the message may not be delivered to the application if it has gone past the time. An application may also be informed whether a message failed delivery. When the time-to-live on the message has expired or the message failed delivery, the message may be put in the dead letter queue. The sending application may read the messages in the dead-letter queue and take corrective actions that may range from no action to correcting reasons for failed delivery and resending the message.

As discussed above, the presently disclosed technology can delay the delivery of a flight until a farm is unfrozen. Instead of keeping a persistence state of each frozen farm, as previous technology has done, the presently disclosed use of the service bus can utilize a subscription by each farm to determine, based on these individual farm subscriptions, which of the farms may be frozen or disabled for reading. In this way, the flight delivery state of each frozen farm can be transferred to the service bus from the presently disclosed flight delivery technology until the farm is unfrozen. In an example, when a farm is unfrozen, the service of a farm bus subscription can pull delayed flight information from the service bus, without having to wait for the flight delivery technology to resend this information.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

The term "logic" encompasses any functionality for performing a task. For instance, each operation illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like. Storage media may also refer to a distributed storage media combining the function of a collection of storage memory for a number of devices to be logically addressed as a single address.

FIG. 1 shows a schematic diagram showing a publication-subscription model 100 for flight delivery to farms between multiple rings. A developer 102 or any similar user can provide an input 104 to indicate the push of a flight, the suspension of a flight, the resuming of a previously suspended flight and other similar inputs. The input can be delivered to a flight management service 106. In an example the flight management service 106 can be running in a global memory of a flight delivery system. The flight management service 106 can include a flight configuration delivery service 108. The flight configuration delivery service 108 can be running on a cloud computing platform and infrastructure that allows the flight configuration delivery service to deploy flights to farms.

The flight configuration delivery service 108 can identify with a request 110 to a farm temperature service 112, the identity of farms in the cloud computing platform as well as the specific logical rings where these farms may be located. The temperature farm service 112 can be used to identify the activity of farms. In an example, a frequently or recently used farm can correspond to a hotter representative temperature than the representative cool temperature of a farm used unfrequently. In an example, the temperature farm service 112 can identify deactivated or unreachable farms as very cold farms or frozen farms. As discussed above, a frozen farm activation may be by user request where the user may wish to avoid changes in features for their farm. A farm may be frozen only for a predetermined period of time.

Based on the identified farms and rings, a flight configuration delivery service 108 can send a flight update message 114 to the service bus. As the service bus can have multiple roles at different times, in FIG. 1, the service bus may be shown first through the action of a service bus of providing a flight configuration update topic 116 publication and later in managing retry attempts and dead letter queue 140. The service bus here may communicate through a publish-subscription model where the farms automatically subscribe to the service bus to receive topic updates, including configuration flights and other flights matching a particular topic, or ring and farm identifier. In an example, flights can come with labels identifying a particular ring or farm or type of farm that should use the flight for updates. Similarly, a farm may filter flights on the service bus to find relevant flights for the environments and platforms deployed at that farm, as well as if the flight is addressed to the farm specifically, to all the farms in a ring, or other similar identification of which farms can consume the flight message.

A searching type flight may be deployed to farms to manage rollout in search farms. The use of a search type flight may be used for rolling out new search features in large farm networks for an item or object. The use of the service bus described above in deploying a search type flight assures the delivery of the search type delivery. The search type flight may be used as a means of ensuring a thorough search of any farm that may be online or that may come online. The use of a flight type search may also avoid monitoring the return of search results by a central hub.

In the publication-subscription model, each flight can have its own information. For example, a single flight can identify the farms that can receive a new flight configuration. A flight delivery message can send one message with few message properties that provide details about a flight including: a flight identification (ID), a flight version, a target environment, a ring, a target farm, an identification of a particular type of flight. In an example, a detail for a target farm could be left null for a particular flight in order to indicate the targeting of all farms. Using this information, a subscribed farm may filter the flight messages based on the information such as the target environment, the target farm, and other suitable flight type attribute that can be determined from the flight message. The publication-subscription model can decrease traffic to a central hub in part because one message about one flight for a particular farm labeled topic can be consumed by all farms with that particular label. The farm subscribed and filtering to accept certain flight messages can then consume the message and enact the flight by, for example, updating a configuration database, implementing a new feature, revamping a new user interface, or other suitable flight effects on the farm.

Within this publication-subscription model, when a new flight message is sent, the message from the service bus can be scheduled for delivery with a time delay, sometimes minutes. During this window in time, the flight configuration delivery service can identify if frozen farms are subscribed to the service bus and can preemptively disable the frozen farm subscription to the service bus and extend the message time to live (TTL) from immediate to a few minutes, or to as long as a farm freeze period. In an example, a farm freeze period can last 15 minutes, 14 days, or any other time as determined from the frozen farm itself.

While the publication-subscription model shown here has many advantages, similar deployments such as a push model or a pull model are also possible for use in flight deployment. A pull model, for example, would involve content farms and service fabric farms requesting from a central service any updates for their particular farm based on filtering that can occur based on the ring of the farm, environments, temperature, and other filtering aspects.

In the publication-subscription model show, the message can be consumed 118 if the farms are subscribed to the service bus. In FIG. 1, the farms can include farm 1 120, farm 2 122, farm 3 124, farm 4 126, each divided between three logical rings. As shown, farm 1 120 is in its own ring, RING0 128, farm 2 122 and farm 3 124 share RING1 130, and farm 4 occupies RING2 132. Any other suitable number of farms and configurations within logical rings is also functional. Further, service fabric farm 1 134 and service fabric farm 2 136 consume the message 118 published by the flight configuration update 116 of the service bus. Service fabric farms can include resources associated with the infrastructure of a fabric in a farm or for a number of farms. In an example flights addressing a database management configuration or network device management can be sent to service fabric farms in the same way as flights shown as being published for farms to consume through subscription.

Disabled subscriptions, due to frozen farms, can still receive messages which can defer flight state management for frozen farms to service bus, rather than making separate system maintain the flight information for each frozen farm until the frozen farm unfreezes. Once the farm freeze ends, the service bus can complete delivery by enabling the subscription so the staged messages at the service bus can be consumed immediately.

As disclosed herein, the service bus can be any suitable service bus that has a guarantee of service protocol. The farms when introduced to an environment, can create a subscription to the service bus on its own servers thereby minimizing impact on other flight management or resource management services. If a service bus is unable to initially deliver a flight, it may move signal 138 a move of expired or failed messages, after a certain number (N) of retry attempts. This information can also be transmitted through the service bus, which now can update to be a flight configuration update of a dead letter queue 140. This publication on the service bus of a configuration update dead letter queue 140 can be subscribed to by the flight configuration delivery service 108 which can consume this list of failed messages 142. Based on the identified failed messages and the farms that failed due to deactivation or other reasons of failure, an update message 144, including an identification of the failed/expired messages, can be sent to a database (DB) 146 for future reference for recovery and retry attempts.

Figure 2:
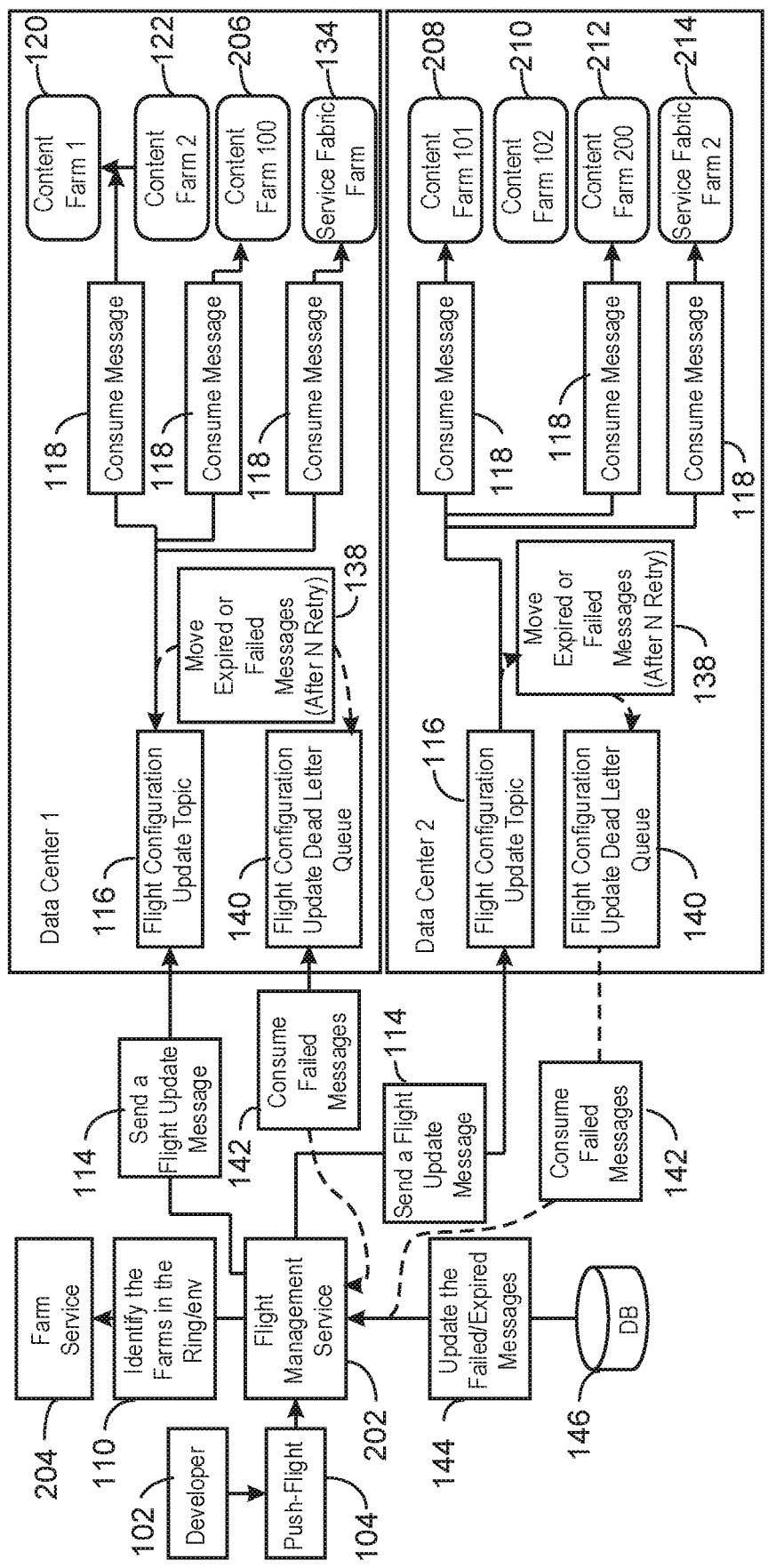
FIG. 2 shows a schematic diagram showing a publication-subscription model for flight delivery to farms across multiple data centers.

FIG. 2 shows a schematic diagram showing a publication-subscription model for flight delivery to farms across multiple data centers 200. Like numbered items are as described in FIG. 1.

In FIG. 2, a multiple data center flight management service 202 is shown providing flights to farms. Similar to above, the multiple data center flight management service 202 identifies farms by ring and environment 110 at a farm service 204. The identification of farms for updating by environment for varied data centers can vary frequently as the logical divisions may encourage the implementation of different environments in different data centers. Further, various deployments can be filtered by data center, or also by a region which can contain several data centers. As used herein, the region may be tied to a physical area boundary in the world.

As shown in FIG. 2, there is an additional allowance showing a large potential number of farms, including and potentially exceeding farm 100 206. Farm 101 208, farm 102 201, farm 200 212, and service fabric farm 2 214 show the capability of multiple data centers to include a large number of farms. Data center 1 216 and Data center 2 218 each contain similar deployments of farms and dedicated instances of server buses. For example, the flight management service 202 can deploy a separate server bus 116, 140 for both data center 1 216 and data center 2 218.

This presently disclosed flight delivery technique can include two service bus instances, and also a primary service bus and a secondary service bus where each runs in the different data centers described. In an example, additional service buses can be used for larger numbers of data centers. To accommodate the multiple service bus architecture, the use of smart libraries to manage the flights sent on each service bus to guarantee the delivery of the flights via primary or secondary service bus. The use of two service buses across data centers that may share resources or data can increase availability of the overall system and also can allows hot deployment without any outage while still maintaining a flight delivery architecture that uses a service bus to communicate with a farm.

Figure 3:
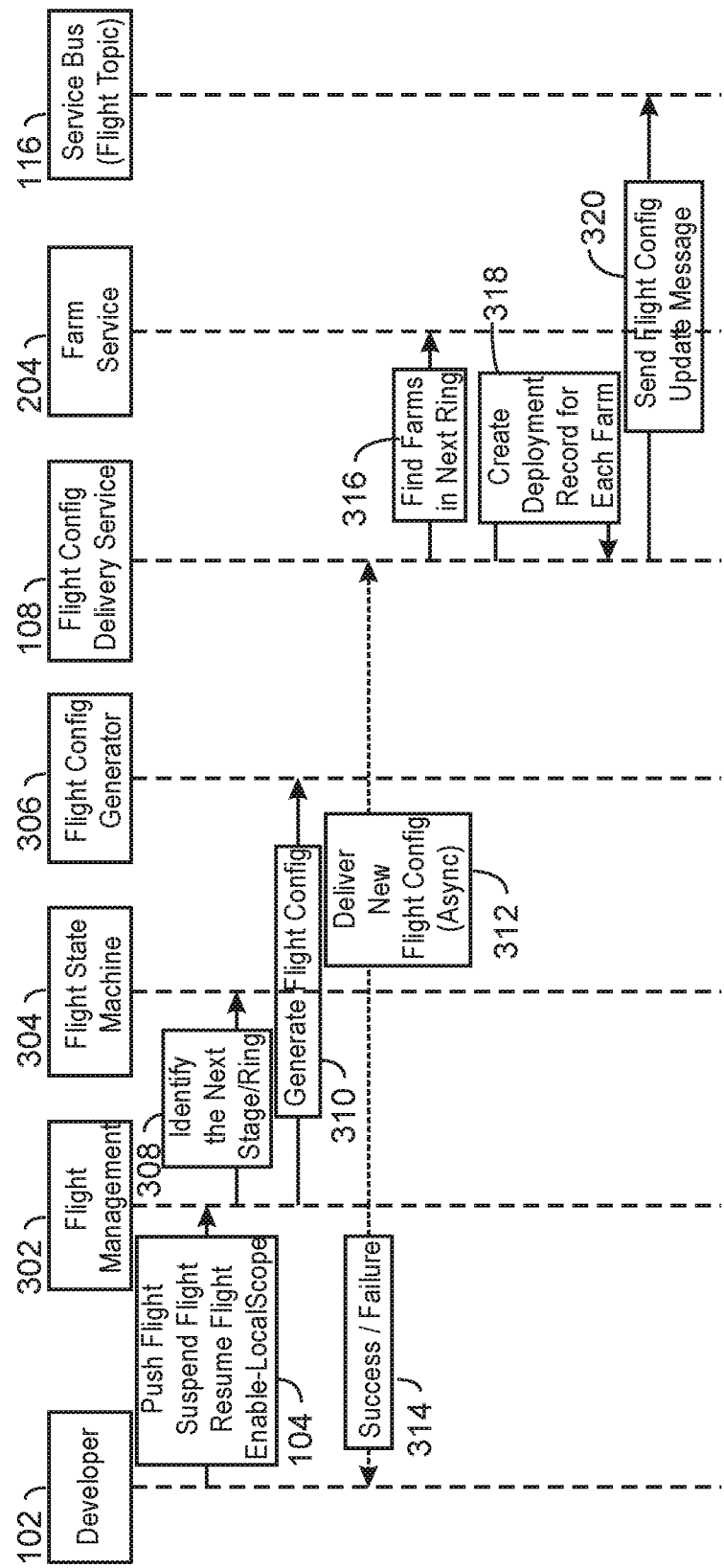
FIG. 3 shows an example timing diagram for a publication-subscription model of flight delivery to farms.

FIG. 3 shows an example timing diagram for a publication-subscription model 300 of flight delivery to farms. Like numbered items are as described in FIG. 1 and FIG. 2.

The example timing diagram can show the steps and timing involved in the publishing and subscription to a service bus for flight information. In addition to the components already disclosed above, the timing diagram also shows a flight management module 302, a flight state machine 304, and a flight configuration generator 306 all for the management of the flight publication-subscription model.

After the developer 102 has provided input 104 to the flight management module 302, an identification of the next stage or logical ring can be made to the flight state machine 304. In an example the flight state machine can track a flight temperature or logical state such as disabled, active, or similar states. The flight management module 302 can also request the generation of a flight configuration from the flight configuration generator 306. Once generated, the new flight configuration can be delivered 312 to be consumed or not, depending, at least in part, on the activity of the farms. The success of failure of delivering the configuration results can then be relayed back to the developer 102.

The delivery of the configuration arrives at a flight delivery service 108, the delivery can include a search 316 from the farm service, for a farm in the next logical ring from the one currently identified. Upon identifying a farm, the flight configuration delivery service 108 can create a deployment record for each farm to determine success or not. Once a record has been created, the flight configuration update message can be sent to the service but (Flight Topic) 116 for publishing and consuming by farms.

Figure 4:
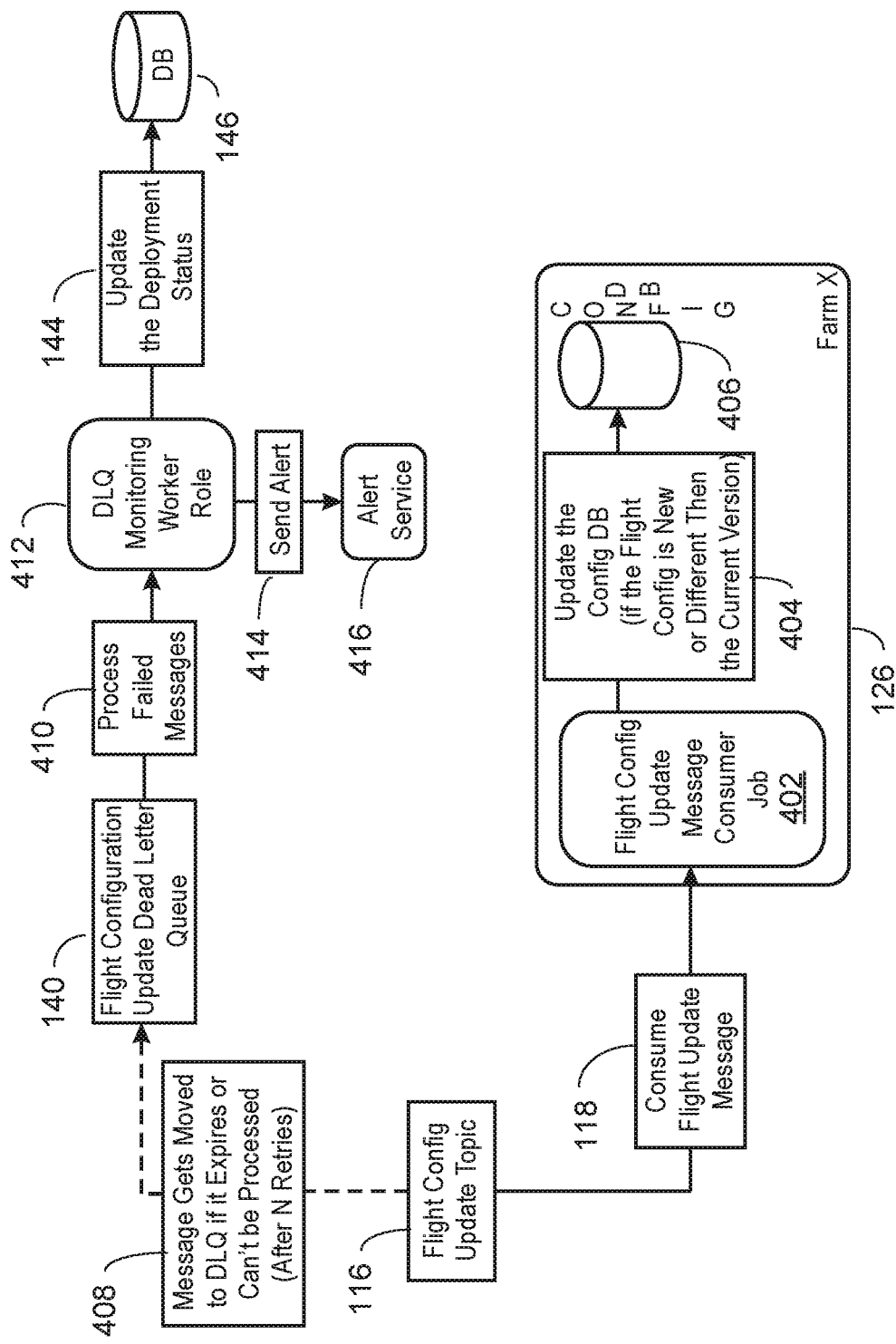
FIG. 4 shows a schematic diagram showing a configuration database being updated and how the flight system can handle rejected messages.

FIG. 4 shows a schematic diagram showing a configuration database being updated 400 and how the flight system can handle rejected messages. Like numbered items are as described in FIG. 1.

When a subscription model farm, such as a configuration database like farm 4 126, detects a flight configuration update topic publication 116, it can consume the flight update message 118. This task can be assigned to a sub component of the farm 4 that monitors flight configuration update and a messaging consuming job 402. The consumed message can then be used to update 404 the configuration database 406 if the update 404 is a new of different version of the current version of the configuration database 406 version.

If the configuration update doesn't get through to the farm, then the message can be moved 408 to the service bus in a dead letter queue 140. The flight configuration update dead letter queue can be processed for failed messages 410 by a dead letter queue worker role 412. The dead letter queue working role can send an alert to an alert service notifying about the failed message. This alert could be used to identify farms that need a recovery or retried flight attempt.

Figure 5:
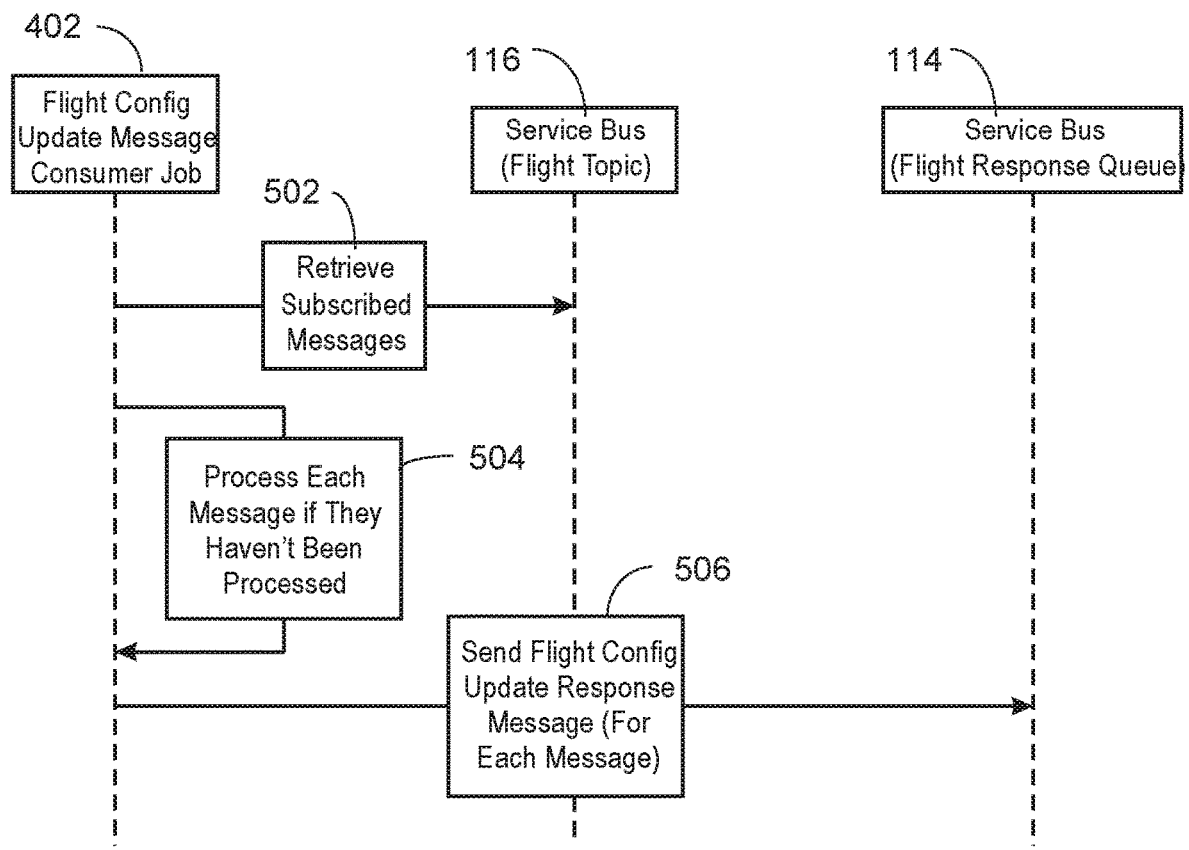
FIG. 5 shows an example timing diagram for updating the configuration of a database and handling rejected messages.

FIG. 5 shows an example timing diagram for updating the configuration of a database and handling rejected messages. Like numbered items are as discussed in FIG. 1 and FIG. 4.

In addition to the module identifying the flight configuration update message consumer job 402 and the service bus for flight topics 116, this timing diagram also shows the service bus with a general flight response queue 502 rather than a dead letter queue exclusively.

As messages are retrieved 504 from a service bus flight topic 116, each of these messages can be processed 506 if they haven't already been processed. Then for each message, a flight configuration update response message 508 can be sent to the service bus storing the flight response queue 502. A complement to flight topics may be subscriptions, which allow the workflow to interact with associations between farms and the service bus. Subscriptions may be created on a service bus using create methods and delete methods.

Signatures may be included in methods to create a subscription and instantiate the workflow specific to the parameters. A list of parameters may be determined by a workflow author, so the parameters may differ from one definition to another. A list of subscription parameters may be specified as metadata of the workflow definitions. The subscription parameters may be provided when the subscription is created. In an example, the list of initialization parameters may be specified in Extensible Application Markup Language (XAML) as part of a workflow. The initialization parameters may be provided when the workflow is instantiated.

Figure 6:
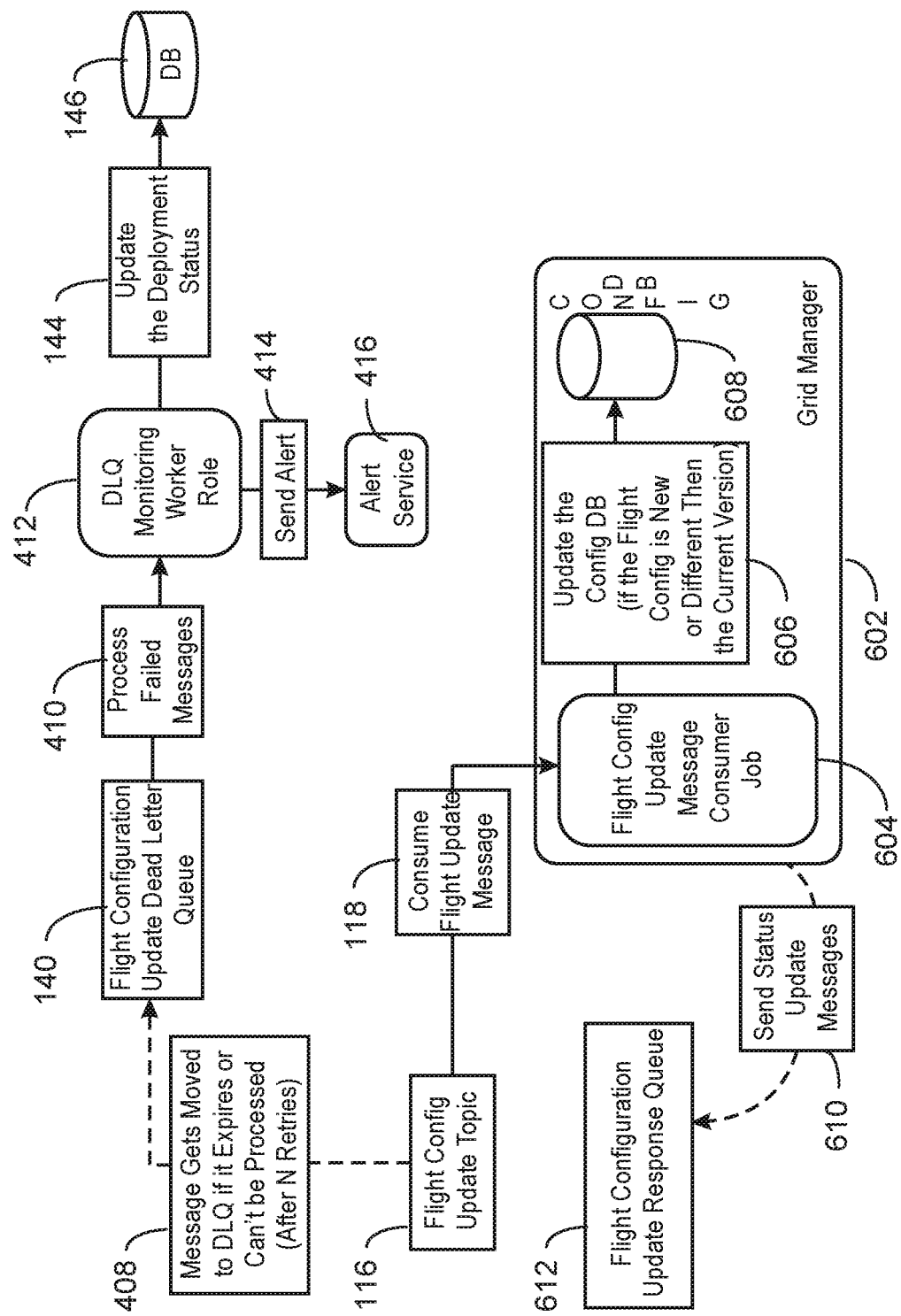
FIG. 6 shows a schematic diagram showing a grid manager and grid database being updated by the flight system.

FIG. 6 shows a schematic diagram showing a grid manager 600 and grid database being updated by the flight system. Like numbered items are as described in FIG. 1 and FIG. 4.

In addition to farms including only a configuration database, the present technology also shows the use of a grid based database system. In an example, grid database systems in service fabric farms such as service fabric farm 1 134, service fabric farm M 136, or service fabric farm 2 214. For example, when a grid manager 602 consumes a flight update message 118 that can be done by the flight configuration update message consumer job of the grid manager. Once consumed, the message can be used to update 606 the grid database 608 if the flight content is new or different than the content presently stored in the grid database 608.

As discussed above, grid based database systems may refer to service fabric farms that enables the building of applications for managed device networks. The service fabric farms may rely on applications composed of microservices that run on a shared pool of machines referred to as a cluster. The grid based database system may provide a runtime to build distributed, scalable, stateless and stateful microservices for the applications. The grid based database system may provide application management capabilities to provision, deploy, monitor, upgrade/patch, and delete deployed applications.

Service fabric may provide runtime and lifecycle management capabilities to applications that are composed of microservices. Service fabric may host microservices inside containers that are deployed and activated across the service fabric clusters. A move from virtual machines to a container may make it possible to increase application density on the pool of machines. A database in a service fabric may be run through the use of a number of stateful microservices.

Clusters may be created for Service Fabric in varied environments. The operating system running on local host may be matched to an operating system or other software that runs on a local development cluster. The operating system running on local host may be matched to what software may be deployed to the same cluster in other environments.

Figure 7:
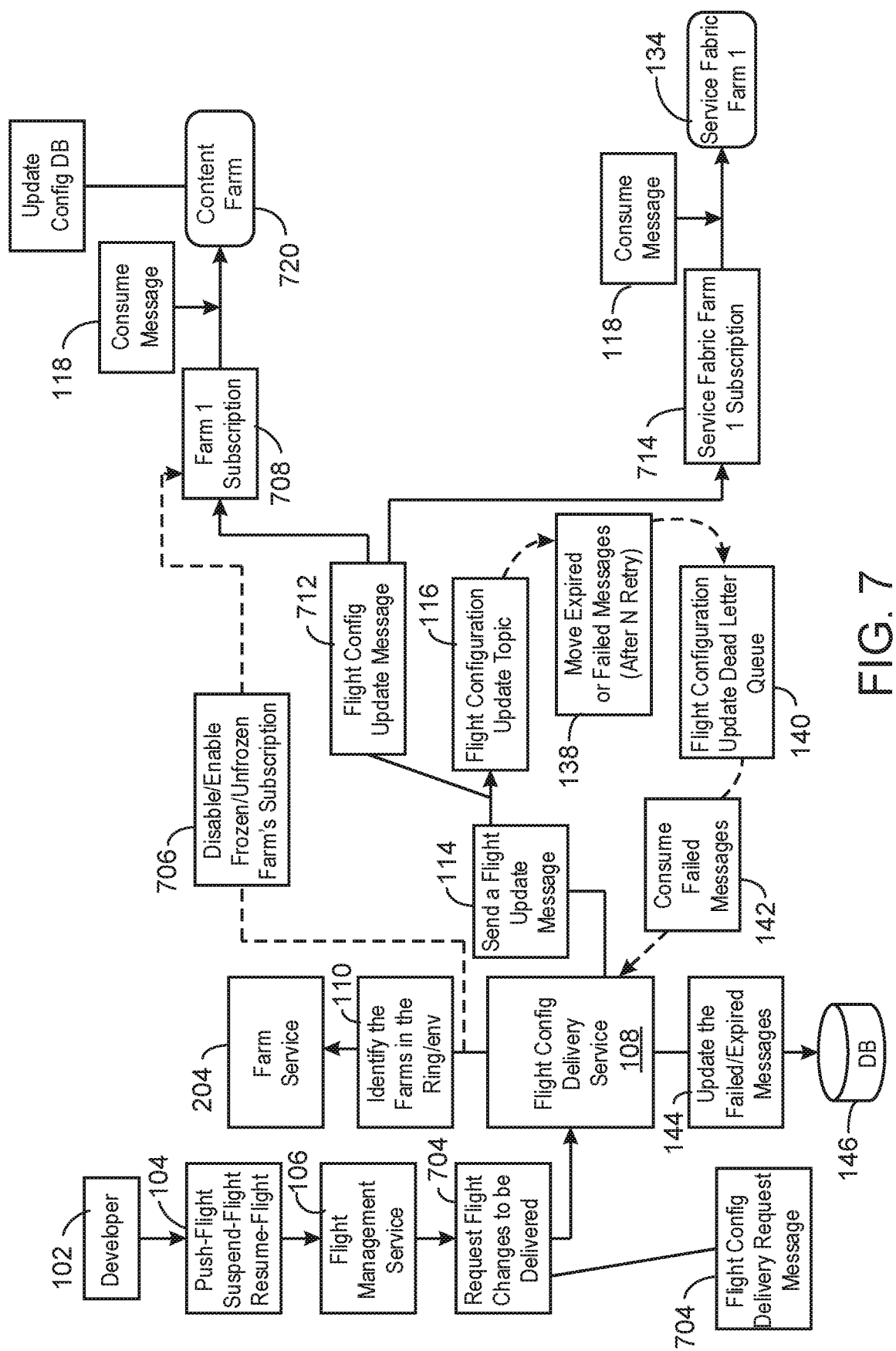
FIG. 7 shows a schematic diagram showing a publication-subscription model for flight delivery of flight changes to a farm and a service fabric farm.

FIG. 7 shows a schematic diagram showing a publication-subscription model for flight delivery of flight changes 700 to a farm and a service fabric farm. Like numbered items are as described with regards to FIG. 1, FIG. 2, and FIG. 4.

Upon a request from a developer 102 or similar user, those requests 702 for flight changes to be delivered can be passed to the flight configuration delivery service 108, the passing of this message could be considered the flight configuration delivery request message 704. Prior to delivering the flight to the service bus, a check 706 could be made as to whether the subscription of the farm were enabled or disabled, for example, if the farm was frozen, then the subscription to the service bus might be disabled. This check 706 could be part of a dynamic farm identification for each rollout of a flight. In an example, the rollout to each flight can be activated based on the temperature of farms. As discussed above, the temperature of farms can refer to the activity or how recently active the farm was with the more active farms being warmer and the less active farms being cooler.

This disabled/enabled check can check directly on the current subscriptions of the farm, for example the Farm 1 subscription 708 of content farm 710. Upon determining that a farm has a subscription enabled, the flight configuration delivery service 108 can send a flight update message 114 containing a flight configuration update message 712 to the service bus for publishing a flight configuration update topic 116. From the service bus, both the farm 1 subscription 708 and the service fabric farm 1 subscription 714 can consume the message 118 for the content farm 710 and service fabric farm 1 134, respectively.

In an example of this dynamic farm deployment, the coldest farms can be activated first by a flight management service to reduce the potential adverse impact of a new flight to the customers. As more metrics collected on each flight, and where these metrics can show that the flight and configuration does not adversely affect customers and systems, the flights could be rolled out to warmer farms.

As discussed above, the farm temperature can be a dynamic attribute which it gets updated constantly. This can result in the coldest farm from a previous time no longer being the coldest farm and having a different order in a dynamic farm flight delivery system.

Figure 8:
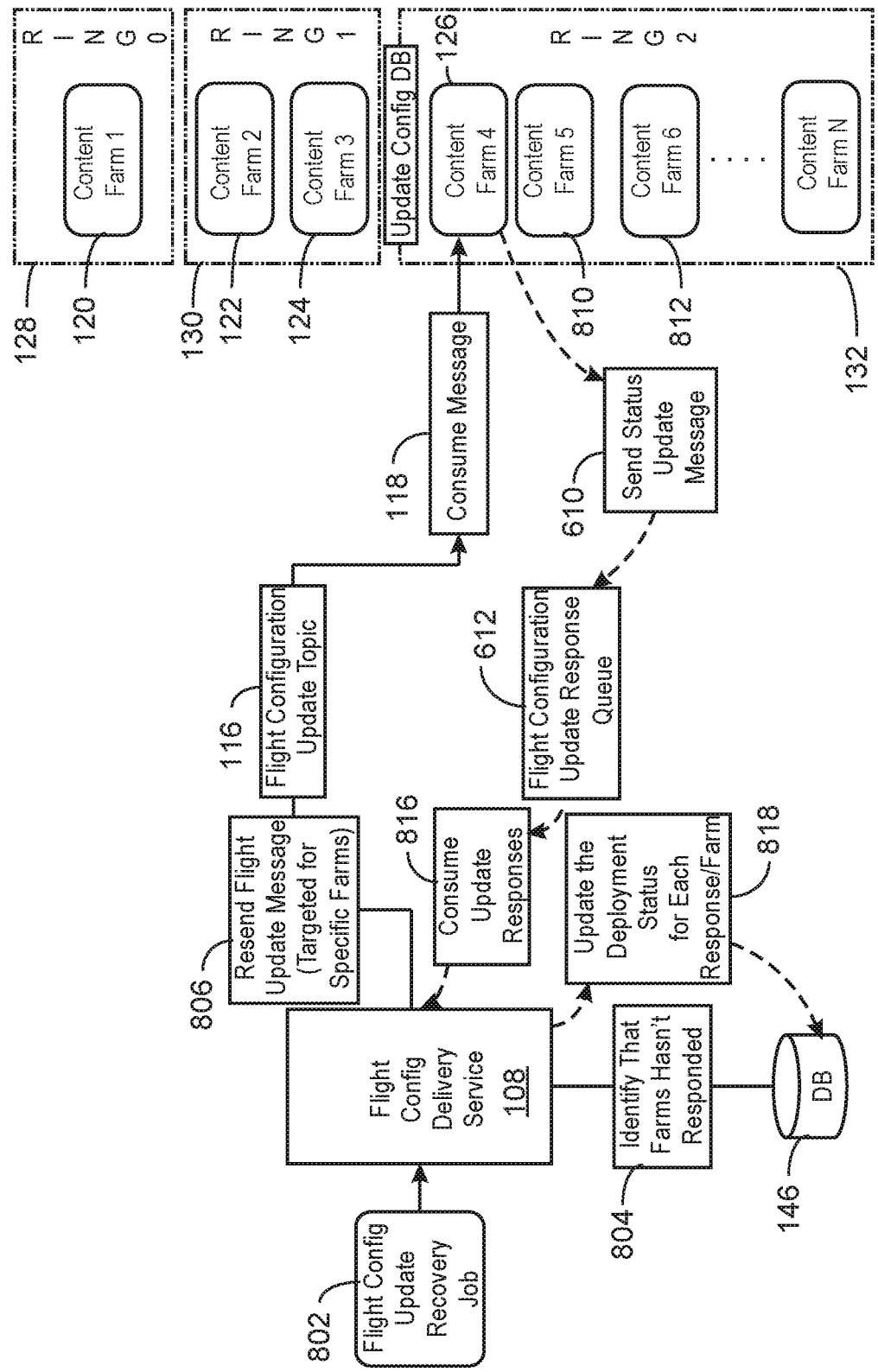
FIG. 8 shows a schematic diagram showing a recovery job that recovers flights that have not yet been sent for resending to the farms.

FIG. 8 shows a schematic diagram showing a recovery job 800 that recovers flights that have not yet been sent for resending to the farms. Like numbered items are as described with regards to FIG. 1 and FIG. 6.

The recovery job 800 can refer to the resending of flights that were unsuccessful in reaching their designated farm in previous attempts. This process can begin with a flight configuration update recovery job 802 prompting a response from a flight configuration delivery service 108. The flight configuration delivery service 108 can then check an attached database 146 for the identity of farms that haven't responded 804. Based on the returned list of farms, the flight configuration delivery service 108 can resend 806 the flight update message. This resent flight update message 806, can target specific farms and logical rings to the exclusion of other, originally requested flights to all subscribing farms. For example, although there are additional farms including farm 5 808, farm 6 810, and any number (N) of farms 812, all within RING2 132 with farm 4 126, only the configuration database of farm 4 126 is updated 404.

If the update is successful then this update to the single farm can be provided to the flight configuration update response queue 612 for the message to be consumed 814 by the flight configuration delivery service 108. Upon consuming the update message 814, the flight configuration delivery service 108 can also update the deployment status for each response and individual farm in the database 146.

Figure 9:
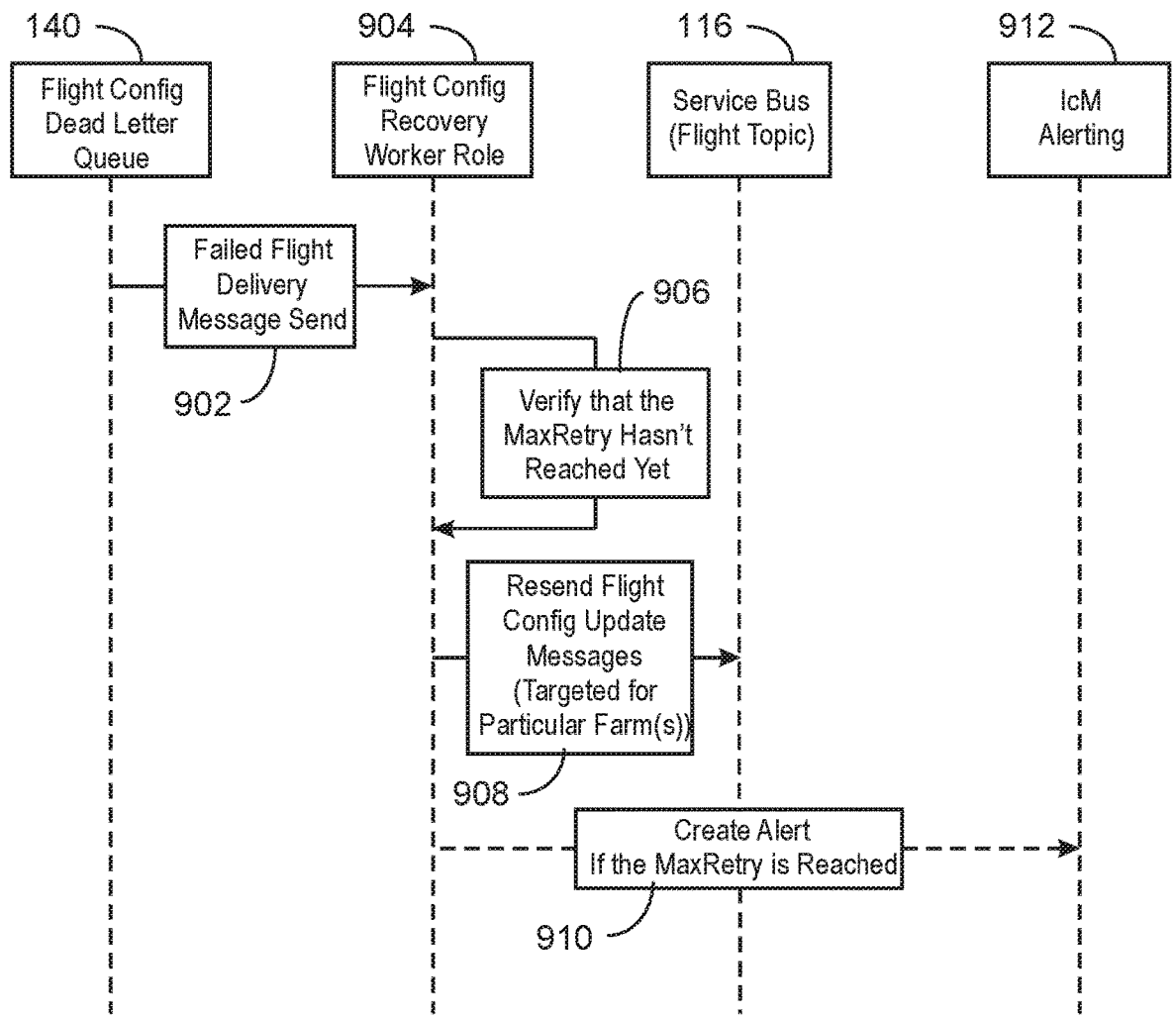
FIG. 9 shows an example timing diagram for a recovery job that recovers flights that have not yet been sent for resending to the farms.

FIG. 9 shows an example timing diagram for a recovery job that recovers flights 900 that have not yet been sent for resending to the farms. Like numbered items are as described with regards to FIG. 1.

In addition to the modules described with regards to FIG. 1, the flight configuration dead letter queue 140, can send a failed flight delivery message 902 to a flight configuration recovery worker role 904. At the flight configuration recovery worker role 904 module, it can be verified 906 that the maximum number of flight messaging attempts has or has not been reached. If the maximum number of attempts has not been reached, then the flight configuration update message can be sent again, with targeting for the specific farms that have not yet received the flights. The flight configuration recovery worker role 904 can also create an alert for sending to an incident management (IcM) alerting 912 system if the maximum number of flight messaging attempts has been reached.

Figure 10:
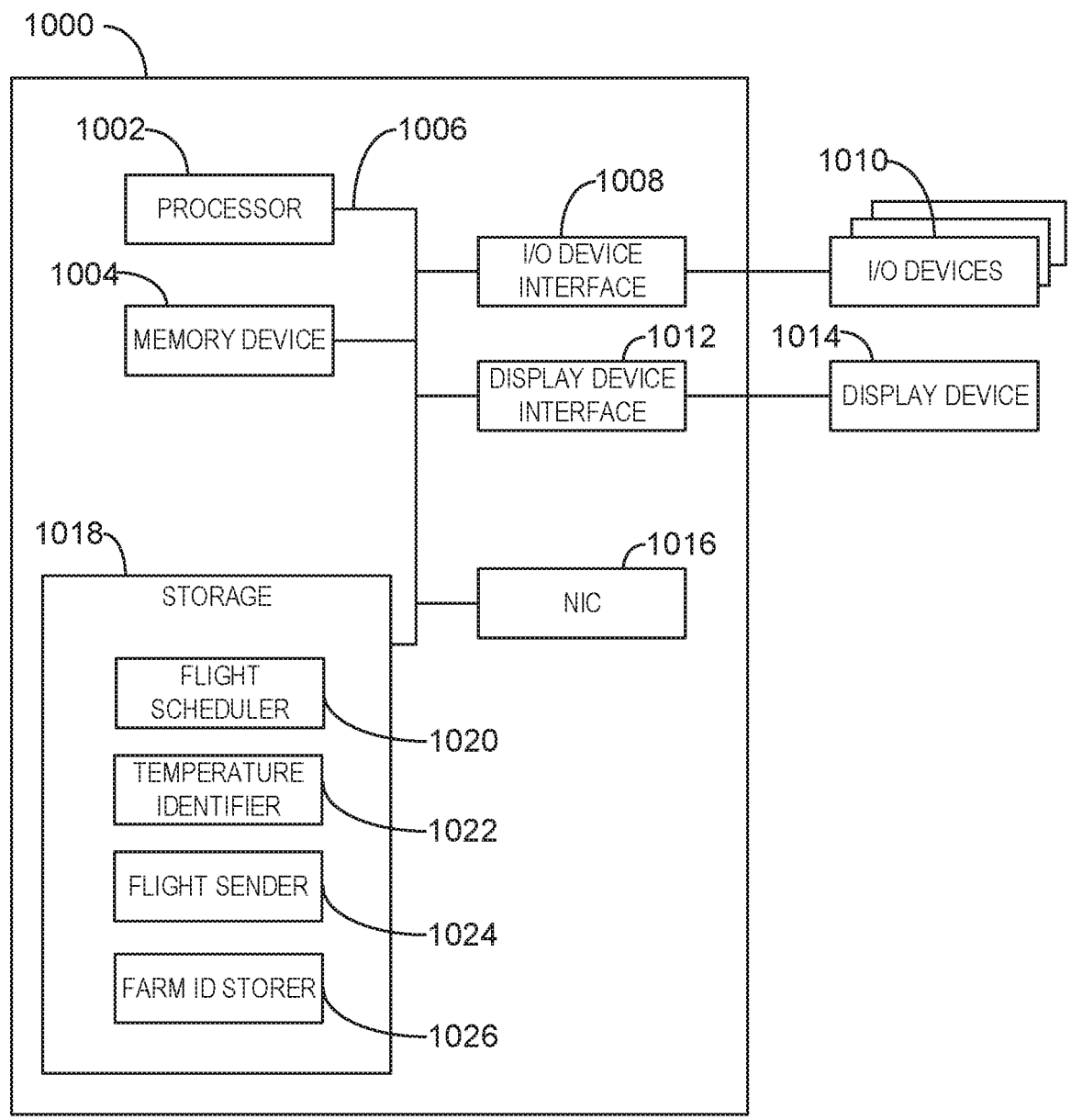
FIG. 10 is a block diagram of an example of a computing system for a flight delivery architecture.

FIG. 10 is a block diagram of an example of a computing system 1000 for a flight delivery architecture. The computing system 1000 may be, for example, a mobile phone, laptop computer, desktop computer, or tablet computer, among others. The computing system 1000 may include a processor 1002 that is adapted to execute stored instructions, as well as a memory device 1004 that stores instructions that are executable by the processor 1002. The processor 1002 can be a single core processor, a multi-core processor, a computing cluster, or any number of other configurations. The memory device 1004 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 1002 may be connected through a system bus 1006 (e.g., PCI, ISA, PCI-Express, NuBus, etc.) to an input/output (I/O) device interface 1008 adapted to connect the computing system 1000 to one or more I/O devices 1010. The I/O devices 1010 may include, for example, a keyboard, a gesture recognition input device, a voice recognition device, and a pointing device, wherein the pointing device may include a touchpad or a touchscreen, among others. The I/O devices 1010 may be built-in components of the computing system 1000, or may be devices that are externally connected to the computing system 1000.

The processor 1002 may also be linked through the system bus 1006 to a display device interface 1012 adapted to connect the computing system 1000 to a display device 1014. The display device 1014 may include a display screen that is a built-in component of the computing system 1000. The display device 1014 may also include a computer monitor, television, or projector, among others, that is externally connected to the computing system 1000. A network interface card (NIC) 1016 may also be adapted to connect the computing system 1000 through the system bus 1006 to a network (not depicted).

The storage 1018 can include a hard drive, an optical drive, a USB flash drive, an array of drives, or any combinations thereof. The storage 1018 may include a flight scheduler 1020, a temperature identifier 1022, a flight sender 1024, and a farm identification storer 1026. The flight scheduler 1020 can provide configuration information to a farm. In an example, the temperature identifier 1022 can identify a temperature of the farm. The flight sender 1024 can send the flight to a service bus that alerts the farm of the flight for the farm to consume. In an example, the service bus can alert the farm based on the temperature of the farm. The farm identification storer 1026 can store at the instruction of the flight configuration delivery service, an identification of the farm that did not consume the flight in the memory. In an example, this can also include the service bus attempting to modify a retry attempt timing for a retry flight to the farm in response to a notification that the flight was not consumed by the farm. Further, a retry flight attempt may send configuration information including an identification of the farm that has not consumed the flight yet.

In an example, the system may also instruct the withholding of the flight from the service bus for the farm identified as a frozen farm and modifying a retry attempt timing for a retry flight, wherein the retry attempt timing is based on information about the frozen farm status of the farm. In another example, the flight can be sent to the service bus and delivered to a content farm and service fabric farm. In another example, the system can include sending a report to an offsite flight delivery system, the report including an identification of the farm not consuming the flight. In some embodiments, the farm can subscribe to the service bus and can be identified by a data center and a ring number.

It is to be understood that the block diagram of FIG. 10 is not intended to indicate that the computing system 1000 is to include all of the components shown in FIG. 10. Rather, the computing system 1000 can include fewer or additional components not illustrated in FIG. 10 (e.g., additional applications, additional modules, additional memory devices, additional network interfaces, etc.).

Figure 11:
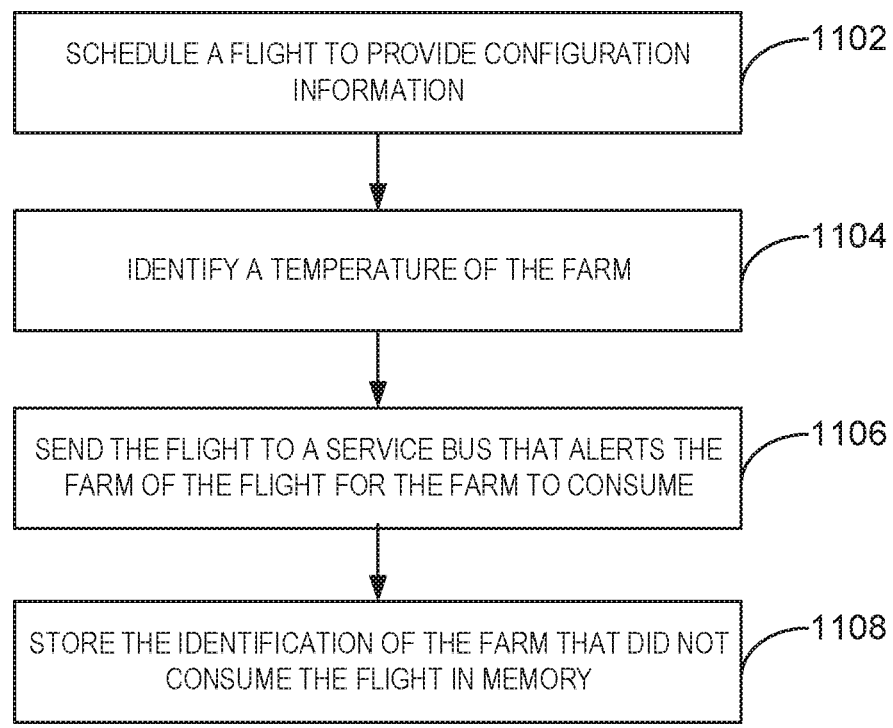
FIG. 11 is a process flow diagram of an example process for a flight delivery architecture.

FIG. 11 is a process flow diagram of an example process 1100 for a flight delivery architecture. The method 1100 can be implemented with any suitable computing device, such as the computing system 1000 of FIG. 10. Like numbered items are as described in FIG. 10.

At block 1102, the method includes scheduling a flight to provide configuration information to a farm. At block 1104, the method includes identifying a temperature of the farm. At block 1106, the method includes sending the flight to a service bus that alerts the farm of the flight for the farm to consume. In an example, the service bus can alert the farm based on the temperature of the farm.

At block 1108, the method includes storing, with the flight configuration delivery service, an identification of the farm that did not consume the flight in the memory. In an example, the method can also include attempting to modify a retry attempt timing for a retry flight to the farm in response to a notification that the flight was not consumed by the farm. Further, a retry flight attempt may send configuration information including an identification of the farm that has not consumed the flight yet.

In an example, the method may also include instructing the withholding of the flight from the service bus for the farm identified as a frozen farm and modifying a retry attempt timing for a retry flight, wherein the retry attempt timing is based on information about the frozen farm status of the farm. In another example, the flight can be sent to the service bus and delivered to a content farm and service fabric farm. In another example, the method can include sending a report to an offsite flight delivery system, the report including an identification of the farm not consuming the flight. In some embodiments, the farm can subscribe to the service bus and can be identified by a data center and a ring number.

Figure 12:
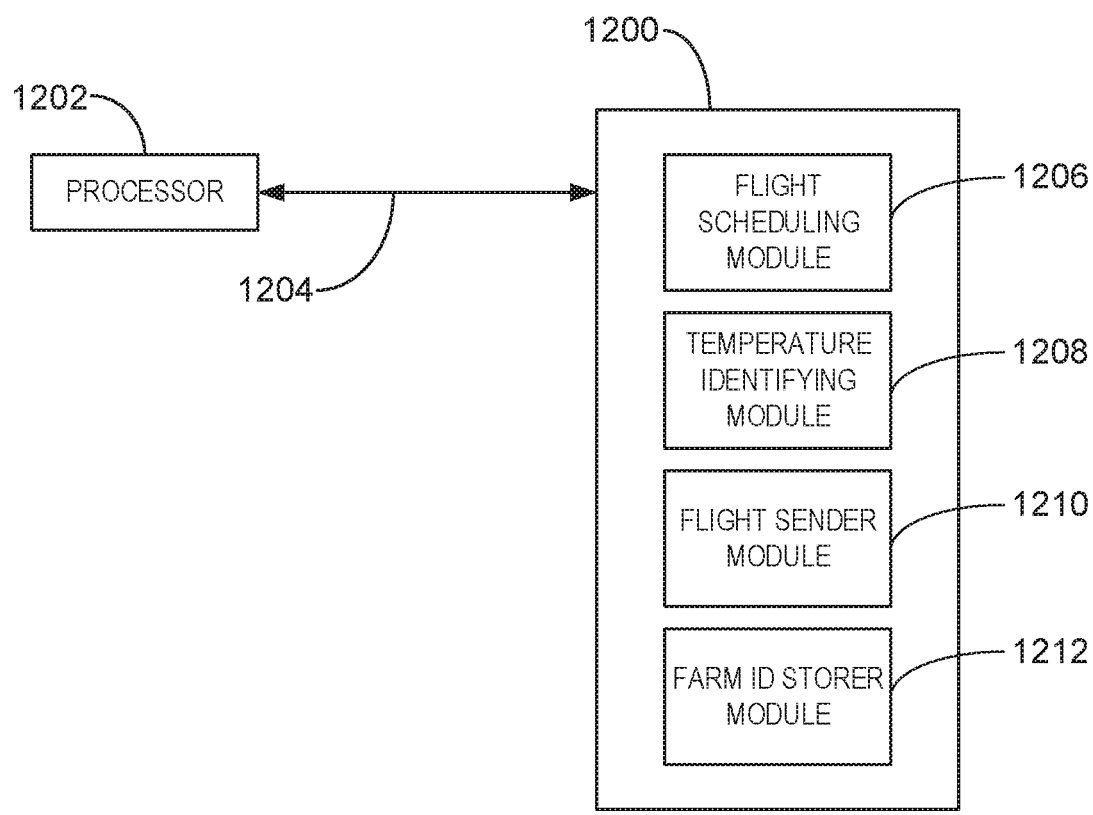
FIG. 12 is block diagram of an example computer-readable storage media for a flight delivery architecture.

FIG. 12 is block diagram of an example computer-readable storage media for a flight delivery architecture. Like numbered items are as described in FIG. 10. The tangible, computer-readable storage media 1200 may be accessed by a processor 1202 over a computer bus 1204. Furthermore, the tangible, computer-readable storage media 1200 may include code to direct the processor 1202 to perform the steps of the current method.

The various software components discussed herein may be stored on the tangible, computer-readable storage media 1200, as indicated in FIG. 12. For example, the tangible computer-readable storage media 1200 can include a flight scheduling module 1206 to provide configuration information to a farm. The tangible computer-readable storage media 1200 can include a temperature identifying module 1208 to identify a temperature of the farm. The tangible computer-readable storage media flight sending module 1210 to send a flight to a service bus that alerts the farm of the flight for the farm to consume. In an example, the service bus can alert the farm based on the temperature of the farm.

In an example, the tangible computer-readable storage media 1200 can include a farm identification storer module 1212 to store, at the instruction of the flight configuration delivery service, an identification of the farm that did not consume the flight in the memory. In an example, the service bus can manage retry attempts by lengthening the time between each attempt. Further, a retry flight attempt may send configuration information including an identification of the farm that has not consumed the flight yet.

In an example, the instructions may direct the processor to withhold the flight from the service bus for the farm identified as a frozen farm and modifying a retry attempt timing for a retry flight, wherein the retry attempt timing is based on information about the frozen farm status of the farm. In another example, the flight can be sent to the service bus and delivered to a content farm and service fabric farm. In another example, the instructions may direct the processor to send a report to an offsite flight delivery system, the report including an identification of the farm not consuming the flight. In some embodiments, the farm can subscribe to the service bus and can be identified by a data center and a ring number.

It is to be understood that any number of additional software components not shown in FIG. 12 may be included within the tangible, computer-readable storage media 1200, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLES

Example 1

Example 1 is a system for flight delivery. The example system for flight delivery includes a memory and a processor to execute a flight configuration delivery service instruction to schedule a flight by sending the flight to a service bus based on an identification of a temperature of a farm, wherein the service bus publishes information of the flight for the farm to consume, wherein the service bus returns a notification to the flight configuration deliver service identifying the farm that does not consume the flight, and wherein the service bus manages retry flight delivery attempts to the farm and the flight configuration delivery service stores an identification of the farm that did not consume the flight in the memory.

Example 2

Example 2 includes the flight delivery system of Example 1, including or excluding optional features. In this example, the service bus modifies a retry attempt timing for a retry flight to the farm in response to the notification.

Example 3

Example 3 includes the flight delivery system of Example 1, including or excluding optional features. In this example, the flight configuration delivery service withholds the flight from the service bus for the farm identified as a frozen farm and modifies the retry attempt timing for a retry flight, wherein the retry attempt timing is based on information about the frozen farm status of the farm.

Example 4

Example 4 includes the flight delivery system of Example 1, including or excluding optional features. In this example, the flight sent to the service bus is consumed by a content farm and a service fabric farm.

Example 5

Example 5 includes the flight delivery system of Example 1, including or excluding optional features. In this example, the flight configuration delivery service sends the service bus configuration information for a retry flight attempt can include an identification of the farm that has not consumed the flight yet.

Example 6

Example 6 includes the flight delivery system of Example 1, including or excluding optional features. In this example, the flight configuration delivery service sends a report to an offsite flight delivery system, the report can include an identification of the farm not consuming the flight.

Example 7

Example 7 includes the flight delivery system of Example 1, including or excluding optional features. In this example, the farm subscribes to the service bus.

Example 8

Example 8 includes the flight delivery system of Example 1, including or excluding optional features. In this example, the farm is identified by a data center and a ring number.

Example 9

Example 9 is a method for flight delivery. The example method for flight delivery includes scheduling a flight to provide configuration information to a farm, identifying a temperature of the farm, sending the flight to a service bus that alerts the farm of the flight for the farm to consume, wherein the service bus alerts the farm based on the temperature of the farm, the service bus to manage retry flight delivery attempts to the farm, and storing, with the flight configuration delivery service, an identification of the farm that did not consume the flight in the memory.

Example 10

Example 10 includes the flight delivery method of Example 9, including or excluding optional features. In this example, the service bus modifies a retry attempt timing for a retry flight to the farm in response to the notification.

Example 11

Example 11 includes the flight delivery method of Example 9, including or excluding optional features. In this example, the flight delivery method can include withholding the flight from the service bus for the farm identified as a frozen farm, and modifying the retry attempt timing for a retry flight, wherein the retry attempt timing is based on information about the frozen farm status of the farm.

Example 12

Example 12 includes the flight delivery method of Example 9, including or excluding optional features. In this example, the flight sent to the service bus is consumed by a content farm and a service fabric farm.

Example 13

Example 13 includes the flight delivery method of Example 9, including or excluding optional features. In this example, the retry flight attempt sends configuration information can include an identification of the farm that has not consumed the flight yet.

Example 14

Example 14 includes the flight delivery method of Example 9, including or excluding optional features. In this example, the flight delivery method can include sending a report to an offsite flight delivery system, the report can include an identification of the farm not consuming the flight.

Example 15

Example 15 includes the flight delivery method of Example 9, including or excluding optional features. In this example, the farm subscribes to the service bus.

Example 16

Example 16 includes the flight delivery method of Example 9, including or excluding optional features. In this example, the farm is identified by a data center and a ring number.

Example 17

Example 17 is a tangible, non-transitory, computer-readable medium that can include instructions that, in response to an execution by a processor delivers flights. The example computer-readable medium can include instructions that in response to execution by a processor can schedule a flight to provide configuration information to a farm, identify a temperature of the farm, send the flight to a service bus that alerts the farm of the flight for the farm to consume, wherein the service bus alerts the farm based on the temperature of the farm, and store, with the flight configuration delivery service, an identification of the farm that did not consume the flight in the memory.

Example 18

Example 18 includes the computer-readable medium of Example 17, including or excluding optional features. In this example, the computer-readable medium, can include instructions that, in response to execution by a processor, direct the processor to modify, with the service bus, a retry attempt timing for a retry flight to the farm in response to the notification.

Example 19

Example 19 includes the computer-readable medium of Example 17, including or excluding optional features. In this example, the computer-readable medium, can include instructions that, in response to execution by a processor, direct the processor to withhold the flight from the service bus for the farm identified as a frozen farm, and modify the retry attempt timing for a retry flight, wherein the retry attempt timing is based on information about the frozen farm status of the farm.

Example 20

Example 20 includes the computer-readable medium of Example 17, including or excluding optional features. In this example, the flight sent to the service bus is consumed by a content farm and a service fabric farm.

What is claimed is:

1. A system for flight delivery comprising:
   a memory;
   a processor to execute a flight configuration delivery service instruction to schedule a flight by sending the flight to a service bus based on an identification of a temperature of a farm of a plurality of farms, where the temperature measures a recency of activity;
   the service bus to publish update information of the flight for the farm to consume, where the flight is scheduled based on the temperature of the farm, the flight configuration delivery service to be turned off when the flight is published for the farm to consume, the service bus returns a notification to the flight configuration delivery service identifying the farm that does not consume the flight; and
   the service bus to manage retry flight delivery attempts to the farm that does not consume the flight and the flight configuration delivery service stores an identification of the farm that did not consume the flight in the memory.

2. The system of claim 1, wherein service bus modifies a retry attempt timing for the retry flight to the farm in response to the notification.

3. The system of claim 1, wherein the flight configuration delivery service:
   withholds the flight from the service bus for the farm identified as a frozen farm; and
   modifies the retry attempt timing for a retry flight, wherein the retry attempt timing is based on information about a frozen farm status of the farm.

4. The system of claim 1, wherein the flight sent to the service bus is consumed by a content farm and a service fabric farm.

5. The system of claim 1, wherein the flight configuration delivery service sends service bus configuration information for a retry flight attempt comprising an identification of the farm that has not consumed the flight yet.

6. The system of claim 1, wherein the flight configuration delivery service sends a report to an offsite flight delivery system, the report comprising an identification of the farm not consuming the flight.

7. The system of claim 1, wherein the farm subscribes to the service bus.

8. The system of claim 1, wherein the farm is identified by a data center and a ring number.

9. The system of claim 1, wherein the processor is to determine a frozen farm period from the farm that does not consume the flight, the processor to modify a time-to-live (TTL) of the flight to at least as long as the frozen farm period.

10. A method comprising:
    scheduling a flight to provide configuration information to a farm;
    identifying a temperature of the farm of a plurality of farms, where the temperature measures a frequency of activity at the farm over a period of time;
    sending the flight to a service bus that alerts the farm of the flight for the farm to consume, wherein the service bus alerts the farm based on the temperature of the farm, a flight configuration delivery service to be turned off when the flight is published for the farm to consume, the service bus to manage retry flight delivery attempts to the farm that does not consume the flight; and
    storing, with a flight configuration delivery service, an identification of the farm that did not consume the flight in a memory.

11. The method of claim 10, wherein service bus modifies a retry attempt timing for the retry flight to the farm in response to a notification.

12. The method of claim 10, comprising
    withholding the flight from the service bus for the farm identified as a frozen farm; and
    modifying the retry attempt timing for a retry flight, wherein the retry attempt timing is based on information about a frozen farm status of the farm.

13. The method of claim 10, wherein the flight sent to the service bus is consumed by a content farm and a service fabric farm.

14. The method of claim 10, wherein the retry flight attempt sends configuration information comprising an identification of the farm that has not consumed the flight yet.

15. The method of claim 10, comprising sending a report to an offsite flight delivery system, the report comprising an identification of the farm not consuming the flight.

16. The method of claim 10, wherein the farm subscribes to the service bus.

17. The method of claim 10, wherein the farm is identified by a data center and a ring number.

18. A tangible, non-transitory, computer-readable medium comprising instructions that, in response to an execution by a processor:
    schedule a flight to provide configuration information to a farm;
    identify a temperature of the farm of a plurality of farms, where the temperature measures a recency of activity;
    send the flight to a service bus that alerts the farm of the flight for the farm to consume, wherein the service bus alerts the farm based on the temperature of the farm, a flight configuration delivery service to be turned off when the flight is published for the farm to consume, the service bus to retry a flight delivery attempt to a farm that does not consume the flight; and
    store, with the flight configuration delivery service, an identification of the farm that did not consume the flight in a memory.

19. The computer-readable medium of claim 18, comprising instructions that, in response to execution by a processor, direct the processor to modify, with the service bus, a retry attempt timing for the retry flight to the farm in response to a notification in response to a detection from the memory that the farm has been identified as not consuming the flight.

20. The computer-readable medium of claim 18, comprising instructions that, in response to execution by a processor, direct the processor to:
    withhold the flight from the service bus for the farm identified as a frozen farm; and
    modify a retry attempt timing for a retry flight, wherein the retry attempt timing is based on information about a frozen farm status of the farm.

21. The computer-readable medium of claim 18, wherein the flight sent to the service bus is consumed by a content farm and a service fabric farm.

\* \* \* \* \*